(12) United States Patent
Horiuchi et al.

(10) Patent No.: US 7,487,781 B2
(45) Date of Patent: Feb. 10, 2009

(54) ENERGY CONVERTER AND METHOD OF MAKING THE SAME

(75) Inventors: Makoto Horiuchi, Sakurai (JP); Mitsuhiko Kimoto, Nara (JP); Kazuaki Ohkubo, Takatsuki (JP); Yuriko Kaneko, Nara (JP); Mika Sakaue, Hirakata (JP)

(73) Assignee: Panasonic Corporation, Kadoma (JP)

( * ) Notice: Subject to any disclaimer, the term of this patent is extended or adjusted under 35 U.S.C. 154(b) by 520 days.

(21) Appl. No.: 10/541,924

(22) PCT Filed: Nov. 8, 2004

(86) PCT No.: PCT/JP2004/016520

§ 371 (c)(1),
(2), (4) Date: Jul. 11, 2005

(87) PCT Pub. No.: WO2005/052987

PCT Pub. Date: Jun. 9, 2005

(65) Prior Publication Data

US 2006/0132014 A1   Jun. 22, 2006

(30) Foreign Application Priority Data

Nov. 25, 2003   (JP) .............................. 2003-393600

(51) Int. Cl.
*H01J 1/02* (2006.01)
*H01J 61/52* (2006.01)
*H01K 1/58* (2006.01)

(52) U.S. Cl. .............................. 131/38; 313/11; 313/37; 313/45; 313/578; 313/315; 313/316; 313/333; 313/335; 313/343; 313/350

(58) Field of Classification Search ................... 313/11, 313/37, 38, 45, 578, 315, 316, 333–350
See application file for complete search history.

(56) References Cited

U.S. PATENT DOCUMENTS 5,079,473 A   1/1992   Waymouth

FOREIGN PATENT DOCUMENTS

| JP | 3-102701 A | 4/1991 |
|---|---|---|
| JP | 04-349338 | 12/1992 |
| JP | 5-251059 A | 9/1993 |

(Continued)

OTHER PUBLICATIONS

International Search Report for corresponding PCT/JP2004/016520, mailed Dec. 28, 2004.

(Continued)

*Primary Examiner*—Nimeshkumar D Patel
*Assistant Examiner*—Thomas A Hollweg
(74) *Attorney, Agent, or Firm*—Renner, Otto, Boisselle & Sklar, LLP

(57) ABSTRACT

An energy converter according to the present invention includes a heat source (radiator 1), which receives externally applied energy and raises its temperature, thereby emitting electromagnetic radiations, and a radiation cut portion (mesh 2) for cutting down infrared radiations, of which the wavelengths are longer than a predetermined wavelength. The mesh 2 is a woven or knitted mesh of metal wires. The openings of the woven or knitted mesh have an aperture size that is smaller than the predetermined wavelength.

13 Claims, 5 Drawing Sheets

FOREIGN PATENT DOCUMENTS

| | | |
|---|---|---|
| JP | 10-003891 A | 1/1998 |
| JP | 2000-077888 A | 3/2000 |
| JP | 2003-023288 | 1/2003 |
| WO | WO 3058676 A2 * | 7/2003 |

OTHER PUBLICATIONS

Japanese Office Action for corresponding Application No. 2005-515748, which is the national phase of PCT/JP2004/016520, dated Jun. 27, 2006 (English translation provided).

* cited by examiner (a)

(b)

2 Mesh
1 Radiator

A Aperture Size
3 Tungsten Wire

ENERGY CONVERTER AND METHOD OF MAKING THE SAME

TECHNICAL FIELD

The present invention relates to an energy converter and a method of making the same, and more particularly relates to an illumination source that can exhibit high luminous efficacy with infrared radiations cut down.

BACKGROUND ART

One of major obstacles that prevent an artificial light source from achieving high luminous efficacy is that the light source cannot convert energy into visible radiation without radiating a lot of infrared rays, of which the wavelengths are too long to sense with human eyes, at the expense of the visible radiation.

An incandescent lamp needs no ballasts, has a small size and a light weight, and shows a higher color rendering index than any other artificial light source. Due to these advantageous features, the incandescent lamp is a light source that is used most broadly worldwide. To increase the radiation efficiency of incandescent lamps, people tried to raise the operating temperature of the radiator or to find a radiator that has a small radiation in the infrared range. History teaches us that a carbon filament as a radiator material for an incandescent lamp was replaced by the currently used tungsten filament as a result of those efforts. By using the radiator of tungsten, the radiator could operate at a higher temperature than the radiator of any other material and therefore could reduce the percentage of radiations in the infrared range.

However, in spite of their efforts, the radiation produced by current incandescent lamps, using the tungsten filament, in the visible wavelength range is just 10% of the overall radiations thereof. The majority of the other radiations are infrared radiations, which account for as much as 70% of the overall radiations. Also, the current incandescent lamps cause a heat conduction due to an enclosed gap or a heat loss of 20% due to convection and have a luminous efficacy of about 15 lm/W, which is among the lowest ones in various artificial light sources. This performance of the incandescent lamps has not been improved significantly since 1930's.

Meanwhile, Patent Document No. 1 and other documents disclose a technique of drastically reducing the infrared radiations produced by a radiator and increasing the luminous efficacy of the lamp significantly. According to this technique, an array of very small cavities functioning as waveguides (which are termed "micro-cavities") is provided on the surface of the radiator, thereby cutting down radiations of which the wavelengths exceed a predetermined value (e.g., infrared radiations) and selectively emitting only electromagnetic radiations with the predetermined wavelength. This patent document describes that cavities with a width of about 350 nm and a depth of about 7 µm are arranged at an interval of about 150 nm, thereby cutting down infrared radiations of which the wavelengths exceed about 700 nm. This patent document also describes that the luminous efficacy increases as much as six-fold at an operating temperature of 2,000 K to 2,100 K.

On the other hand, Patent Document No. 2 discloses a technique of cutting down the infrared radiations by winding a single metal fine wire around the filament.

Patent Document No. 1: Japanese Patent Application Laid-Open Publication No. 03-102701

Patent Document No. 2: Japanese Patent Application Laid-Open Publication No. 04-349338

DISCLOSURE OF THE INVENTION

Problems to be Solved by the Invention

One of the biggest problems of the prior art disclosed in Patent Document No. 1 is that it is difficult to make such an array of nanometer-scale cavities on the surface of the radiator from the viewpoint of processing technologies. Another problem is that even if such an array of micro-cavities could be formed successfully on the surface of the radiator, the cavities could still collapse when operated at about 1,200 K for just a few minutes, even though the radiator has a melting point higher than 3,000 K. That is to say, according to this conventional technique, the luminous efficacy of the lamp could not be increased anymore after the lamp has been operated for only a few minutes.

On the other hand, according to the conventional technique disclosed in Patent Document No. 2, if the metal fine wire extended due to thermal expansion when the lamp is operated at a high temperature, then the metal fine wire wound around the filament would have a significantly increased pitch. As a result, radiations that have wavelengths exceeding the predetermined value cannot be cut down constantly.

In order to overcome the problems described above, a primary object of the present invention is to provide an energy converter in which a means for cutting down those radiations with wavelengths exceeding a predetermined value can operate with good stability even at a high temperature. Another object of the present invention is to provide an illumination source (typically, an incandescent lamp) that can maintain the effect of reducing infrared radiations for a long time even when operated at a temperature of 2,000 K or more.

DISCLOSURE OF INVENTION

An energy converter according to the present invention includes: a heat source for emitting electromagnetic radiations; and a radiation cut portion for cutting down infrared radiations, of which the wavelengths are longer than a predetermined wavelength. The radiation cut portion is a woven or knitted mesh of metal wires, openings of the woven or knitted mesh having an aperture size that is smaller than the predetermined wavelength.

In one preferred embodiment, the openings have a substantially square shape, each side of which is shorter than 1 µm.

In another preferred embodiment, the metal wires have a diameter of 2 µm or less.

In another preferred embodiment, the metal wires are made of a refractory material having a melting point higher than 2,000 K.

In another preferred embodiment, the refractory material is at least one material selected from the group consisting of tungsten, molybdenum, rhenium, tantalum and compounds thereof.

In another preferred embodiment, the heat source is made of tungsten or a tungsten compound and operates at a temperature of 2,000 K or more.

In another preferred embodiment, the radiation cut portion is a stack of woven or knitted metal wire meshes, and the stack of woven or knitted meshes is thick enough to limit the emission of the electromagnetic radiations with the predetermined wavelength.

In another preferred embodiment, the predetermined wavelength is 780 nm.

A method of making an energy converter according to the present invention includes the steps of: preparing a heat source that emits electromagnetic radiations; preparing a radiation cut portion that cuts down infrared radiations, of which the wavelengths are longer than a predetermined wavelength; and arranging the radiation cut portion such that the radiation cut portion faces at least one side of the heat source, from which the electromagnetic radiations are emitted. The radiation cut portion is a woven or knitted mesh of metal wires, and openings of the woven or knitted mesh have an aperture size that is smaller than the predetermined wavelength.

In one preferred embodiment, the step of preparing the radiation cut portion includes the step of processing the metal wires while applying tensile stress to the wires.

An apparatus according to the present invention includes: one of the energy converters described above; a translucent bulb for shielding the energy converter from the air; and means for supplying electrical power to the heat source included in the energy converter.

In one preferred embodiment, the apparatus functions as an illumination source.

A radiation cut member according to the present invention cuts down infrared radiations, of which the wavelengths are longer than a predetermined wavelength, and is a woven or knitted mesh of metal wires. The openings of the woven or knitted mesh have an aperture size that is smaller than the predetermined wavelength.

Effects of the Invention

According to the present invention, an energy converter, which may function as a filament for an incandescent lamp, for example, includes a woven or knitted metal wire mesh as a radiation cut means for cutting down electromagnetic radiations, of which the wavelengths exceed a predetermined wavelength, such that the radiation cut means faces the electromagnetic radiation emitting side of a heat source. Thus, the infrared radiations from the heat source can be cut down for a long time and the ratio of visible radiations to the infrared radiations can be increased in an incandescent lamp. As a result, a light bulb with high luminous efficacy and practically long life can be provided.

In addition, the radiation cut means is implemented as a woven or knitted mesh of metal wires, and therefore, exhibits good thermal stability. Furthermore, the aperture size of the mesh openings does not change significantly even if the temperature varies. Consequently, high radiation efficiency can be maintained with good stability.

BEST MODE FOR CARRYING OUT THE INVENTION

First, it will be described with reference to FIGS. 1(a) through 1(c) why when an array of cavities, of which the size is comparable to the wavelengths of visible radiations, is provided on the surface of a tungsten filament used in conventional incandescent lamps, those cavities collapse at an operating temperature that is much lower than the melting point of tungsten. FIG. 1(a) is a plan view of a conventional tungsten filament on which an array of micro-cavities is provided, and FIG. 1(b) is a cross-sectional view thereof.

On the surface of the tungsten filament 10 shown in FIGS. 1(a) and 1(b), provided is an array of micro-cavities 12. Each of those micro-cavities 12 has an inside diameter of 750 nm and a depth of 7 μm, for example. It is believed that those micro-cavities collapse mainly because of the migration of tungsten atoms. More specifically, the actual lattice structure of tungsten has a lot of lattice defects (i.e., the arrangement of atoms is out of order at a lot of sites). Due to these lattice defects, the atoms and crystal grains have discontinuous and irregular arrangements and define a random microstructure. Even if thermal energy that is high enough to vaporize and scatter those atoms or crystals actively is not applied, parts of such a microstructure are constantly on the move (i.e., diffusing or migrating) so as to have its structure stabilized. For example, the grain boundary functions as a sort of hinge so to speak, thereby making the crystal grains flow.

Owing to such a phenomenon, when the surface of a metal with very small unevenness is heated to a high temperature, the atoms will flow to collapse and flatten the very small unevenness on the metal surface just as the surface of a liquid smoothes down. FIG. 1(c) shows how the unevenness on the surface of the tungsten filament 10 has been smoothed out due to the migration of atoms at a high temperature. The present inventors discovered and confirmed via experiments that the micro-cavities 12, which had been present on the surface of the tungsten filament 10, easily collapsed and had their surface smoothed out even at an unexpectedly low temperature (e.g., at a temperature at which tungsten usually hardly vaporizes).

Particularly when the size of the micro-cavities 12 is approximately equal to the wavelengths of visible radiation (on the order of nanometers), the surface of tungsten flattens easily. This could be because those cavities themselves, of which the size is comparable to the wavelength of visible radiation, may function as tiny uneven structures that are as small as lattice defects.

For these reasons, even if very small micro-cavities are formed on the surface of a conventional filament made of tungsten, for example, a practically long life cannot be guaranteed at a normal operating temperature.

Next, a radiation cut means for use in the present invention will be described with reference to FIGS. 2(a) and 2(b). FIG. 2(a) is a partial perspective view illustrating an exemplary mesh structure 20, which functions as a radiation cut means according to the present invention. FIG. 2(b) schematically shows the overall orientation direction of metal crystal grains present in each metal wire 23.

The present inventors discovered and confirmed via experiments that in such a woven or knitted metal wire mesh 20 made up of very fine metal wires 23, of which the diameter was on the order of the wavelength of visible radiation, even if there were some lattice defects in the respective metal wires 23, the mesh structure 20 would hardly collapse at a high temperature exceeding 2,000 K. This should be because even though the constituent atoms or crystal grains of the metal wires 23 are given huge thermal energy at such a high temperature and migrate, the overall migration direction will agree with the axial direction (i.e., the length direction) of the metal wires 23. That is why the mesh structure 20, obtained by weaving or knitting the metal wires 23 so as to define a lot of gaps functioning as micro-cavities, exhibits extremely high thermal stability. On the other hand, as to the very small unevenness provided on the surface of a metal or micropores cut through metal foil, the smaller the size, the less resistant to the heat.

As in the mesh structure 20 used in the present invention, the thermal stability could be further increased by the crystal structure of the metal wires 23. Specifically, the metal wires 23 are usually obtained by drawing its material uniaxially by utilizing the ductility thereof. When the metal is drawn in this manner, the crystal grains will be oriented in the directions pointed by the arrows in FIG. 2(b). As a result, the thermal stability of the metal wires 23 would be further increased.

According to the present invention, the radiation efficiency of an electromagnetic radiator (heat source) within a particular wavelength range is increased by using the mesh structure 20 shown in FIG. 2(a). Thus, a high-efficiency radiator, which guarantees a practically long life even when operated at a high temperature, can be obtained. It should be noted that the mesh structure 20 does not have to have the configuration shown in FIG. 2(a). FIG. 3(a) is a plan view of the mesh structure 20 shown in FIG. 2. Alternatively, the metal wires 23 may also be woven as shown in FIG. 3(b). There are various methods of weaving or knitting the metal wires 23. And the radiation cut means of the present invention may be formed by any known weaving or knitting method.

In either weaving or knitting the metal wires 23 to make the mesh structure 20, the process step of bending the metal wires 23 halfway by utilizing the ductility of the metal wires 23 is repeatedly carried out. Thus, the metal wires 23 can be processed mechanically by using a known metal mesh maker.

Hereinafter, preferred embodiments of the present invention will be described with reference to the accompanying drawings. It should be noted that the present invention is in no way limited to the following illustrative embodiments.

EMBODIMENT 1

First, a first preferred embodiment of an energy converter according to the present invention will be described with reference to FIG. 4.

The energy converter of this preferred embodiment shown in FIG. 4 includes a heat source that emits electromagnetic radiations when heated to a high temperature (which will be referred to herein as a "radiator 1") and a radiation cut means provided around the radiator 1. In this preferred embodiment, the structure functioning as the radiation cut means is a mesh 2 obtained by weaving tungsten fine wires together.

The radiator 1 is usually preferably made of a material that can be used as a filament for an incandescent lamp. However, the "radiator" is not limited herein to the filament that generates heat and emits light in a normal incandescent lamp. Nevertheless, if the energy converter of the present invention is used in an illumination source, then the radiator may be made of a known filament material used in an ordinary incandescent lamp.

It should be noted that the radiator 1 has the function of raising its temperature when given some energy (e.g., electrical energy), converting that energy into electromagnetic radiations, and then emitting the radiations.

The energy converter of this preferred embodiment includes the mesh 2 (to be described more fully below) as a radiation cut means, and therefore, has the function of cutting down radiations of which the wavelengths are longer than a predetermined wavelength. As a result, radiations, of which the wavelengths are equal to or lower than the predetermined wavelength, can be emitted more efficiently.

The mesh 2 of this preferred embodiment is arranged so as to surround the radiator 1 entirely as shown in FIG. 4. However, the mesh 2 does not have to cover the radiator 1 fully, but may also be arranged so as to face only a portion of the surface of the radiator 1, from which the electromagnetic wave to use is radiated. For example, if a plate radiator 1 with a mirrored surface is used, then the mesh 2 may be arranged so as to be opposed to the other surface of the radiator 1.

The radiator 1 may be electrically connected to two stem lines, for example, which are components of a normal incandescent lamp, and receive the electrical energy supplied through the lines. When used as an illumination source, the radiator 1 and the mesh 2 are enclosed in a translucent bulb so as to be shielded from the air (i.e., an oxidizing atmosphere). The radiator 1 is externally supplied with electrical power by way of a base and the stem lines (current supply means) so as to generate Joule heat, raise its temperature and emit light. In this preferred embodiment, the radiator 1 preferably operates at a temperature of 2,000 K or more. The radiator is preferably made of tungsten but may also be made of a tungsten compound or another refractory metal. Furthermore, the radiator does not have to have the shape shown in FIG. 4 but may also have a coiled filament structure adopted in a normal incandescent lamp.

The mesh 2 used in this preferred embodiment is a woven fabric of tungsten wires 3 as shown in FIG. 5. In this preferred embodiment, the tungsten wires 3 have a diameter of about 390 nm and their substantially square openings have an aperture size A of about 390 nm each side. Those openings of the mesh 2 function as waveguides (micro-cavities) with a cutoff wavelength of 780 nm that is twice as long as the aperture size A.

Supposing tungsten has an electrical resistance of 59.1 $\mu\Omega\cdot cm$ at a temperature of 2,000 K, the skin depth of tungsten at a wavelength of 780 nm is 197 nm. Meanwhile, the tungsten wires 3 in the mesh 2 have a diameter of 390 nm. That is why it is possible to avoid an unwanted situation where a plurality of adjacent openings combines together to make the mesh function as waveguides with a longer cutoff wavelength. In this sense, the respective openings of the mesh 2 may be regarded as functioning micro-cavities.

In this preferred embodiment, the mesh 2 with such a configuration is arranged near the radiator 1, and therefore, the infrared radiations with wavelengths exceeding 780 nm, which have been emitted from the radiator 1 toward the mesh 2, are reflected by the mesh 2. This is because the openings (waveguides) of the mesh 2 do not pass radiation modes, of which the wavelengths are longer than a wavelength corresponding to the aperture size of the openings. As a result, radiations (photons) with wavelengths exceeding 780 nm are transmitted through only the tungsten wires 3 of the mesh 2. In this preferred embodiment, the openings of the mesh 2 have an aperture ratio of 25%, and therefore, the emissivity of those photons substantially decreases to 75%. Consequently, the ratio of the infrared radiations to the visible radiation can be reduced and the radiation efficiency of the visible radiation can be improved.

As described above, if very small unevenness functioning as micro-cavities (waveguides) is provided on the surface of the radiator 1, then those cavities collapse at a temperature that is much lower than the melting point of tungsten. However, by adopting the mesh 2 of this preferred embodiment, such a problem can be avoided and a long-term stabilized operation is guaranteed even if the operating temperature is high.

As also mentioned above, even if an extremely fine wire had lattice defects to make atoms or crystal grains flow so as to stabilize the structure at a high temperature, the fine wire itself would never collapse or disappear because those atoms or crystal grains should flow along the major axis of the fine wire. That is why the mesh 2 can keep operating normally for a long time even at a high temperature of 2,000 K or more.

Thus, according to this preferred embodiment, a higher operating temperature is guaranteed compared to the situation where micro-cavities are provided on the surface of the heat radiator (see FIG. 1). As a result, the peak wavelength of usable radiations becomes shorter than that defined by the Wien's displacement law and closer to the visible range. When used as an illumination source, an energy converter exhibiting such radiation characteristics is expected to achieve higher luminous efficacy and replace conventional incandescent lamps in the near future.

Also, the mesh 2 consisting of the tungsten wires 3 can also be arranged in the vicinity of the radiator 1, which is operating at a high temperature, because the mesh 2 has high thermal resistance.

If the mesh 2 of this preferred embodiment is arranged near the radiator 1 with a gap of 1 µm or less provided between them, for example, then the radiator 1 will be sensed as a black body when looked at through the openings of the mesh 2. Accordingly, if a decreased quantity of infrared radiations is transmitted through the openings of the mesh 2, then radiations having shorter wavelengths than the infrared radiations will be transmitted through the openings of the mesh 2 at an increased emissivity. That is to say, the quantity of visible radiation passing through the openings of the mesh 2 increases and the luminous efficacy of the visible radiation improves. For that reason, part or all of the mesh 2 may be in contact with the radiator 1.

As described above, the mesh 2 used in this preferred embodiment is obtained by weaving or knitting at least one metal wire. Thus, compared to the structure disclosed in Japanese Patent Application Laid-Open Publication No. 04-343381 in which a fine wire is wound around a filament, the aperture size of the openings is less likely to vary with the temperature.

It should be noted that the openings of the mesh 2 preferably have an aperture size A of 1 µm or less. If the cutoff wavelength exceeded 2 µm, which is twice as long as the aperture size A, then the percentage of infrared radiations that can pass the mesh would increase.

If the mesh 2 is arranged in the vicinity of the radiator 1 and if the openings of the mesh 2 function as a black body, then the emissivity of radiations with shorter wavelengths than the cutoff wavelength over the entire wavelength range becomes equal to that of the black body (i.e., with an emissivity approximately equal to one). In that case, the emissivity of normal tungsten in the infrared range is 0.4 where the wavelength is up to 1.5 µm (which will be referred to herein as a "short-wave range") and 0.2 where the wavelength is 1.5 µm or more (which will be referred to herein as a "long-wave range"). Accordingly, once the black body emissivity (=1) is achieved in both of these ranges, the rate of increase in emissivity in the long-wave range exceeds that in the short-wave range. Then, the ratio of the infrared radiations to the visible radiation rather increases, thus decreasing the luminous efficacy unintentionally compared to the situation where no mesh 2 is provided. This is inferable from the Wien's displacement law that says the maximum value of the black body radiation is located near a wavelength of 1,500 nm at a temperature of 2,000 K. The lower limit may be about 380 nm because it is necessary to pass light in the visible radiation range.

Meanwhile, the metal wire preferably has a diameter of 2 µm or less. If a mesh with an aperture size of 1 µm is made up of wires with such a diameter (wire diameter), then the aperture ratio will be 10% and the efficiency can be increased to a practical level.

The metal wire more preferably has a diameter of 780 nm or less. In that case, it is expected that photons themselves with wavelengths of 780 nm or more are not so easily absorbed into, or radiated from, the wire. As a result, the quantity of infrared radiations transmitted through the wire decreases, the ratio of the quantity of infrared radiations transmitted through the mesh 2 to that of visible radiation also decreases, and the luminous efficacy would further increase.

The shortest permissible diameter of the metal wire is set approximately equal to the skin depth of the metal used as the material of the wire. The skin depth of tungsten with respect to a wavelength of 780 nm is about 197 nm. That is why the metal wire preferably has a diameter of at least about 197 nm.

The material of the metal wire is not limited to tungsten but may also be molybdenum, rhenium, tantalum, or a compound thereof.

If the energy converter of the present invention is used as an illumination source that emits light sensible to human eyes, then the metal wire to make the mesh is preferably made of a refractory material that has a melting point of at least 2,000 K and that can operate with good stability at temperatures exceeding 2,000 K. To prevent the color of the emission of the illumination source from becoming unnaturally reddish, radiations with short wavelengths of about 400 nm need to be included at an appropriate percentage. For that purpose, the heat radiator preferably has an operating temperature of 2,000 K or more.

The mesh functioning as the radiation cut means may be either a woven mesh or a knitted mesh. The knitted mesh is less likely to come part, and more likely to maintain its original shape, than the woven mesh.

The cross-sectional shape of the metal wire may be either substantially circular or substantially square. The surfaces, defining an opening that functions as a waveguide (i.e., the inner walls of the waveguide), are portions of the respective outer surfaces of the metal wires. Accordingly, if the metal wires have substantially square cross sections, then the mesh may be designed such that portions of the metal wires, defining the mesh openings, have a planar shape. The combined area of those portions of the metal wires, functioning as the inner walls of the waveguide, is the greater in metal wires with substantially square cross sections than in metal wires with substantially circular cross sections.

Each of the four side surface portions of the metal wires, functioning as the inner walls of the waveguide, is substantially parallel to its opposed side surface portion. Thus, as viewed from the surface of the radiator, each mesh opening has a relatively small solid angle. On the other hand, if the metal wires have circular cross sections, each mesh opening has a relatively large solid angle as viewed from the surface of the radiator. That is why the quantity of radiations leaking through the openings can be smaller in metal wires with substantially square cross sections than in metal wires with substantially circular cross sections.

EMBODIMENT 2

Hereinafter, a second preferred embodiment of an energy converter according to the present invention will be described with reference to FIG. 6.

In the preferred embodiment illustrated in FIG. 6, the radiation cut means is implemented as a stack of multiple meshes 2. Each of these meshes 2 may have a configuration just as described for the first preferred embodiment. In this preferred embodiment, the meshes 2 are stacked one upon the other such that associated openings of all those meshes 2 stacked are aligned with each other. In this manner, the openings functioning as the waveguides (i.e., micro-cavities) can have a substantially increased depth (i.e., waveguide length). Accordingly, even if the stack of meshes 2 is arranged a little distant from the radiator 1 but if the depth of the openings of the meshes 2 is at least 1.5 times as large as the aperture size of the meshes 2, then the emissivity of the visible radiation through the openings of the meshes 2 can be increased to that of black body radiation. As a result, the luminous efficacy would increase.

INDUSTRIAL APPLICABILITY

An energy converter according to the present invention is applicable to the filament portion of an incandescent lamp, for example, for use in not just general households but also shops and headlights of cars as well. The present invention can also use the radiation in a required wavelength range more efficiently without dissipating it in vain, thus contributing to saving a lot of energy and eventually conserving the global environment.

Figure 1:
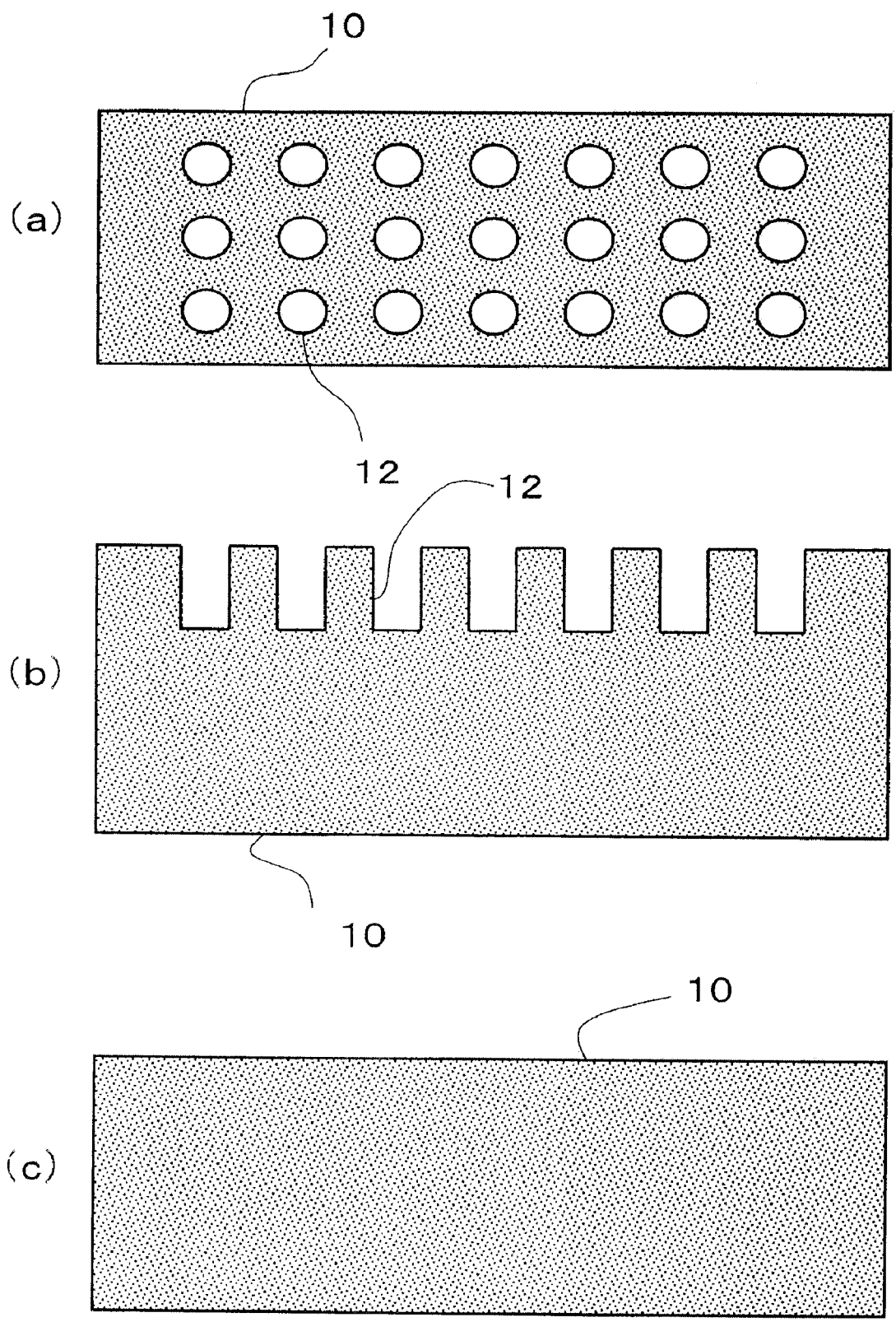
FIG. 1(a) is a top view of a conventional tungsten filament on which an array of micro-cavities is provided.
FIG. 1(b) is a cross-sectional view thereof.
FIG. 1(c) is a cross-sectional view showing the tungsten filament on which the micro-cavities have already collapsed.
Figure 2:
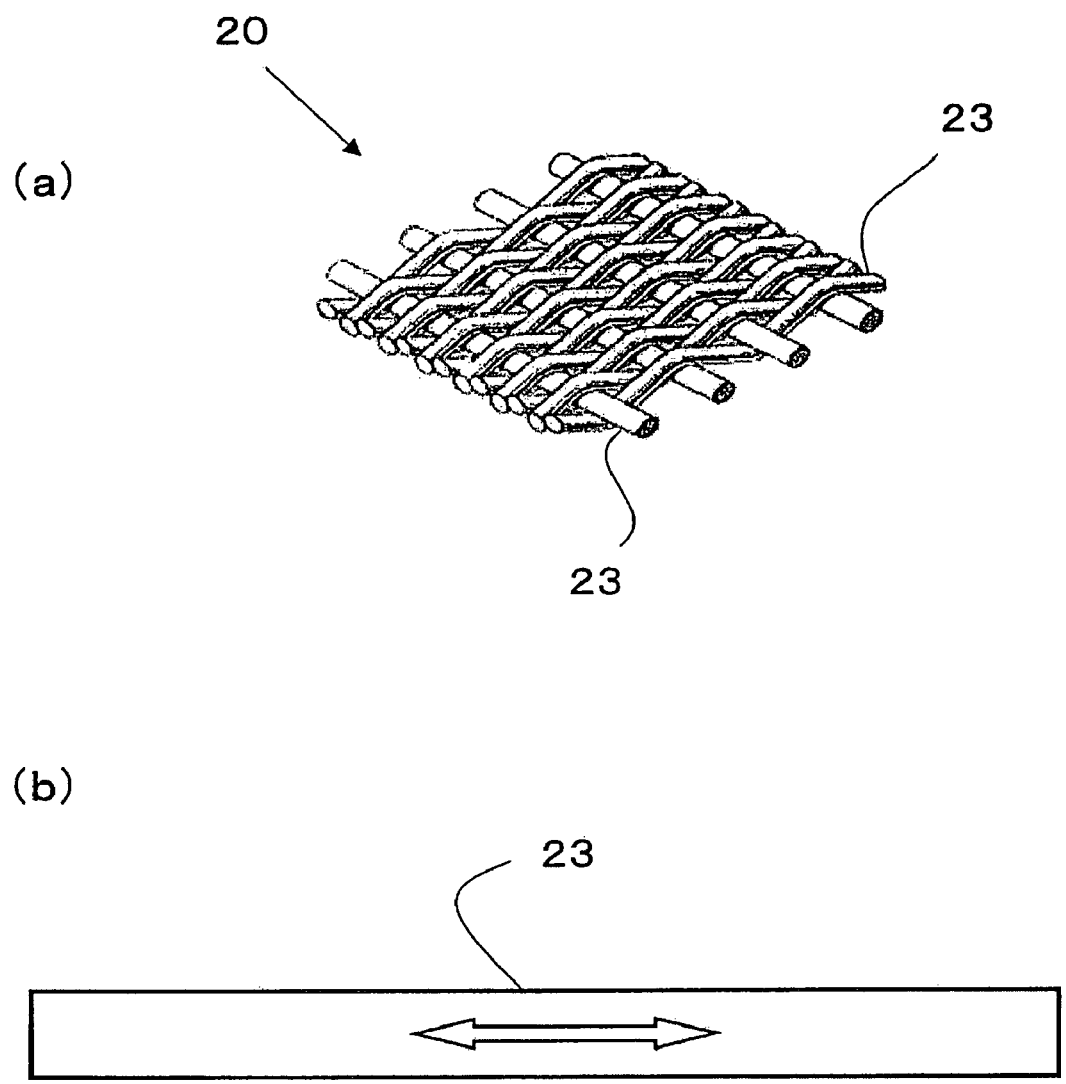
FIG. 2(a) is a partially enlarged perspective view illustrating an exemplary radiation cut means that an energy converter according to the present invention has.
FIG. 2(b) schematically shows the overall orientation direction of crystal grains present in each metal wire 23.
Figure 3:
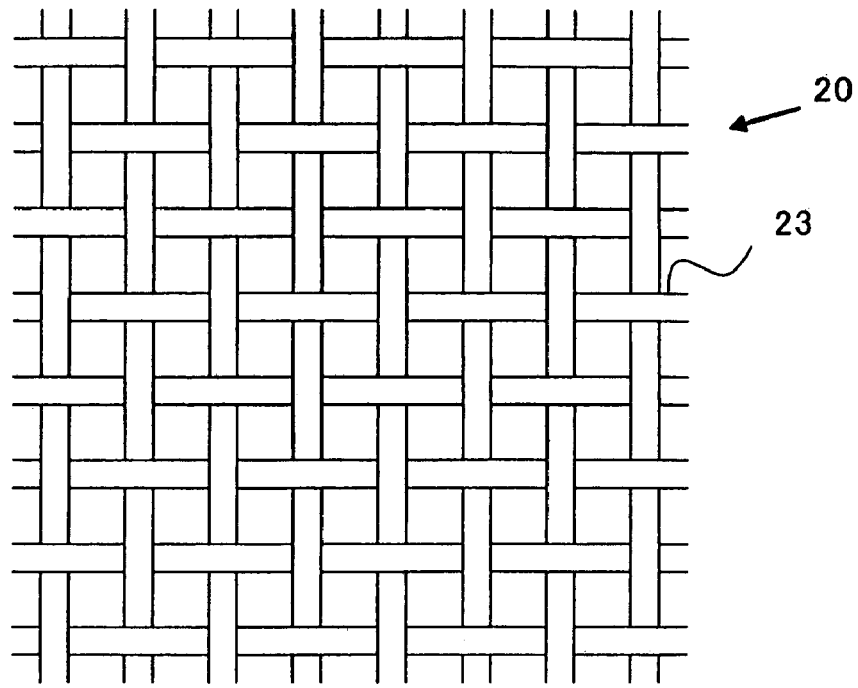
FIGS. 3(a) and 3(b) illustrate exemplary radiation cut means (meshes) for an energy converter according to the present invention.
Figure 3:
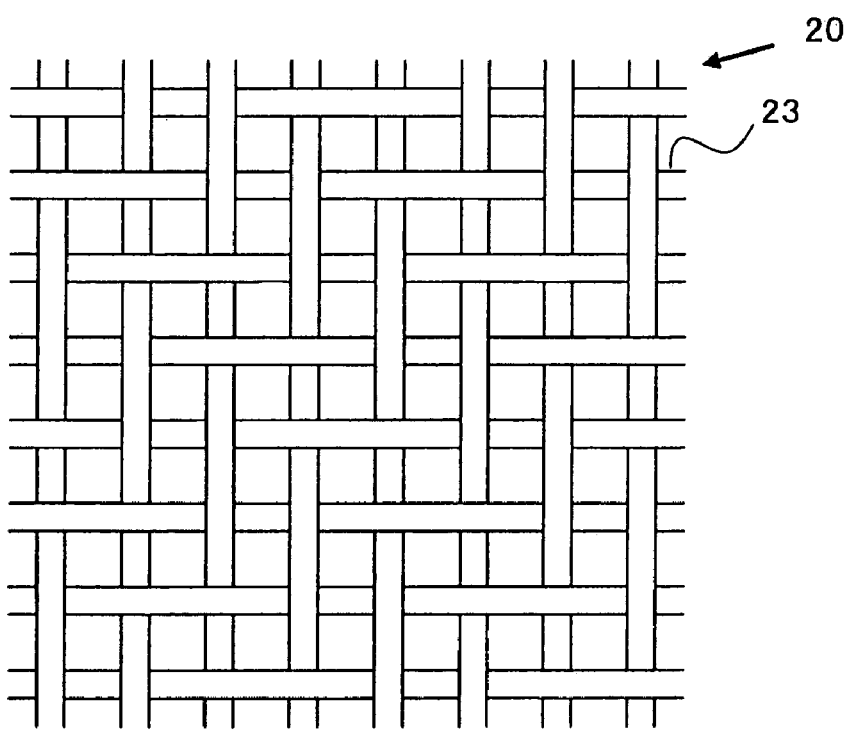
Figure 4:
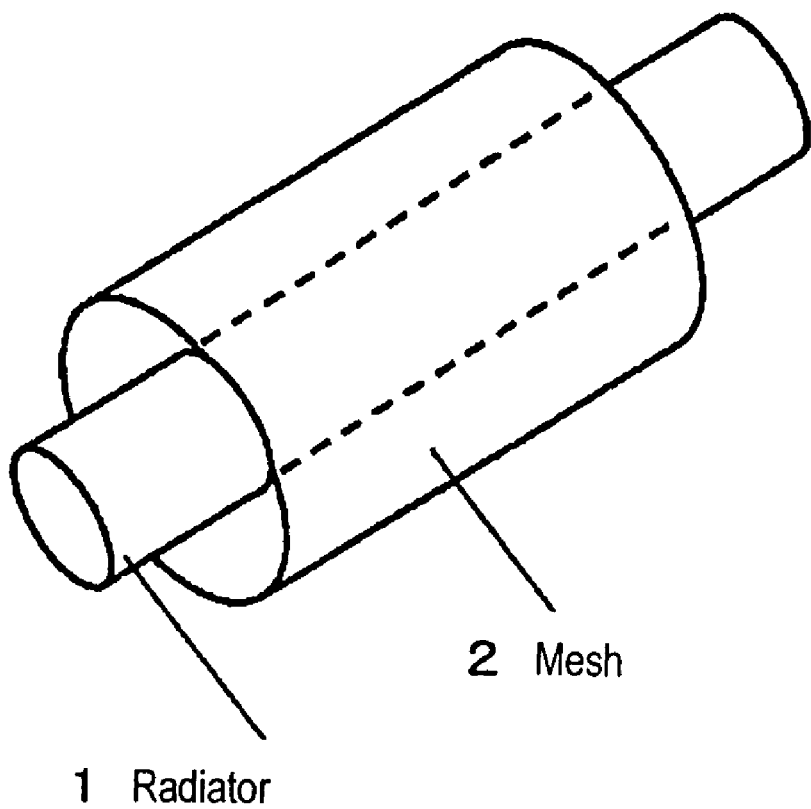
FIG. 4 illustrates a first preferred embodiment of an energy converter according to the present invention.
Figure 5:
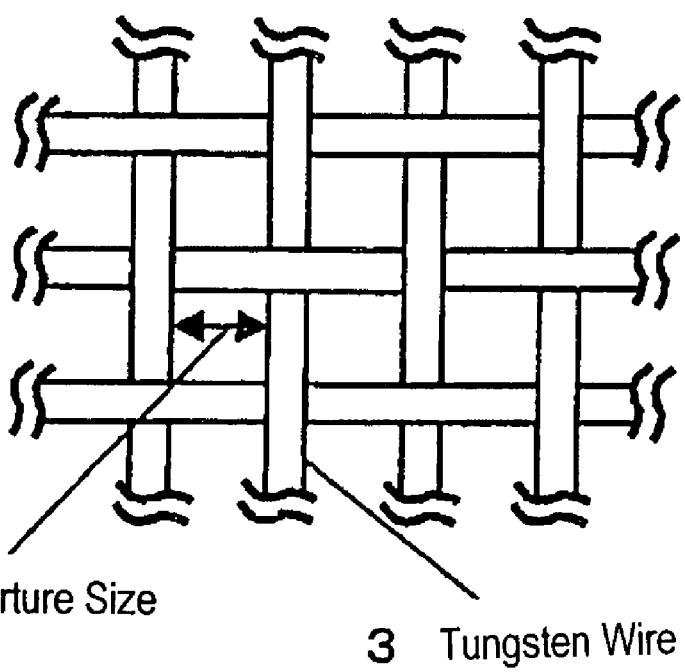
FIG. 5 shows the radiation cut means (mesh) of the first preferred embodiment on a larger scale.
Figure 6:
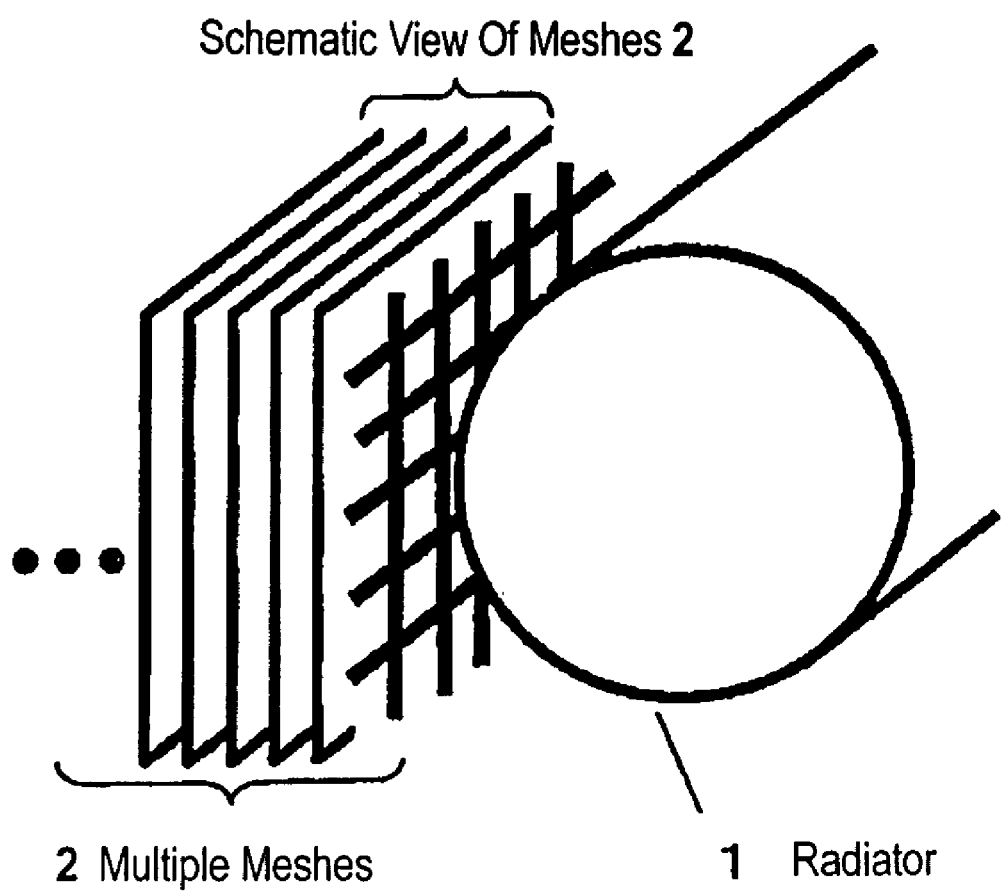
FIG. 6 illustrates a second preferred embodiment of an energy converter according to the present invention.

DESCRIPTION OF THE REFERENCE NUMERALS 1 radiator
2 mesh (woven mesh)
3 tungsten wire
10 tungsten filament
12 micro-cavity
20 mesh structure
23 metal wire
25 gap (mesh opening)

The invention claimed is:

1. An energy converter comprising:
    a heat source for emitting electromagnetic radiations; and
    a radiation cut portion for cutting down infrared radiations, of which the wavelengths are longer than a predetermined wavelength,
    wherein the radiation cut portion is a woven or knitted mesh of metal wires with at least portions of the metal wires being bended to form an intertwined structure having openings, the openings of the woven or knitted mesh having an aperture size that is smaller than the predetermined wavelength.

2. The energy converter of claim 1, wherein the openings have a substantially square shape, each side of which is shorter than 1 µm.

3. The energy converter of claim 1, wherein the metal wires have a diameter of 2 µm or less.

4. The energy converter of claim 1, wherein the metal wires are made of a refractory material having a melting point higher than 2,000 K.

5. The energy converter of claim 4, wherein the refractory material is at least one material selected from the group consisting of tungsten, molybdenum, rhenium, tantalum and compounds thereof.

6. The energy converter of claim 1, wherein the heat source is made of tungsten or a tungsten compound and operates at a temperature of 2,000 K or more.

7. The energy converter of claim 1, wherein the radiation cut portion is a stack of woven or knitted metal wire meshes, and
    wherein the stack of woven or knitted meshes is thick enough to limit the emission of the electromagnetic radiations with the predetermined wavelength.

8. The energy converter of claim 1, wherein the predetermined wavelength is 780 nm.

9. An apparatus comprising:
    the energy converter of claim 1;
    a translucent bulb for shielding the energy converter from the air; and
    means for supplying electrical power to the heat source included in the energy converter.

10. The apparatus of claim 9, wherein the apparatus functions as an illumination source.

11. A method of making an energy converter, the method comprising the steps of:
    preparing a heat source that emits electromagnetic radiations;
    preparing a radiation cut portion that cuts down infrared radiations, of which the wavelengths are longer than a predetermined wavelength; and
    arranging the radiation cut portion such that the radiation cut portion faces at least one side of the heat source, from which the electromagnetic radiations are emitted,
    wherein the radiation cut portion is a woven or knitted mesh of metal wires with at least portions of the metal wires being bended to form an intertwined structure having openings, the openings of the woven or knitted mesh having an aperture size that is smaller than the predetermined wavelength.

12. The method of claim 11, wherein the step of preparing the radiation cut portion includes the step of processing the metal wires while applying tensile stress to the wires.

13. A radiation cut member for cutting down infrared radiations, of which the wavelengths are longer than a predetermined wavelength,
    wherein the radiation cut member is a woven or knitted mesh of metal wires with at least portions of the metal wires being bended to form an intertwined structure having openings, the openings of the woven or knitted mesh having an aperture size that is smaller than the predetermined wavelength.

* * * * *